No. 858,702. PATENTED JULY 2, 1907.
R. BROWN.
GAS BURNER.
APPLICATION FILED DEC. 5, 1905.

WITNESSES:

INVENTOR.
Richard Brown
BY
Spear & Seely
ATTORNEYS.

UNITED STATES PATENT OFFICE.

RICHARD BROWN, OF SAN FRANCISCO, CALIFORNIA.

GAS-BURNER.

No. 858,702.   Specification of Letters Patent.   Patented July 2, 1907.

Application filed December 5, 1905. Serial No. 290,404.

*To all whom it may concern:*

Be it known that I, RICHARD BROWN, a citizen of the United States, residing at San Francisco, in the county of San Francisco and State of California, have invented certain new and useful Improvements in Gas-Burners, of which the following is a specification.

My invention relates to burners for using gas for heating purposes as cooking, heating furnaces, ovens, etc. In such devices it is very important that means be provided for feeding a suitable supply of gas and air to the burner and thoroughly mixing it before it is discharged. It is also necessary that the passage within which the mixing takes place be so open and free that the danger of its choking or stopping up is reduced to the minimum, and the size and shape of the parts of the burner and the amount of metal therein should be such that no perceptible difference in the action of the burner shall occur on account of the gradually increasing heat and especially at the time of starting the burner. For instance, if the passage be made narrow enough to prevent back-firing when the burner is first lighted it is apt to choke after the metal has become thoroughly heated, and especially when the amount of material in the burner is proportionately large or unevenly distributed; and if it be made wide enough to prevent that the combustible material is apt to pass through without being thoroughly mixed. The choking is more likely to occur where the passage is obstructed, as by interspaced ribs or flanges, which form eddies, and the latter where it is too open, as with a substantially funnel shaped passage.

My invention consists in forming the different parts of a burner and in so arranging or combining them that the metal is evenly distributed and a maximum degree of heat is obtained from a given quantity of gas being consumed with the least danger of back-firing or the combustion being destroyed.

Figure 1:
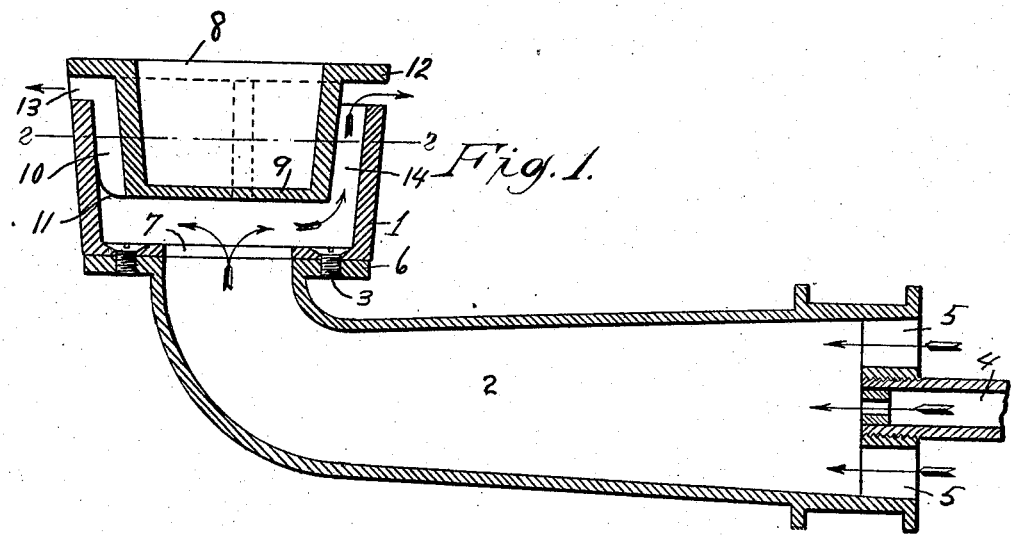
Figure 2:
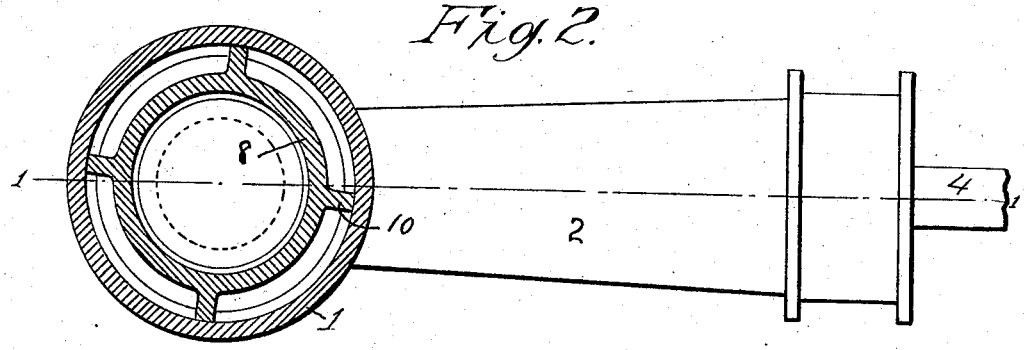
Figure 3:
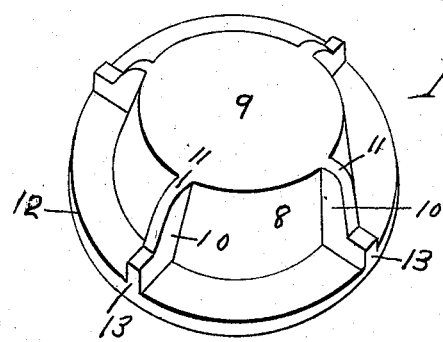

An embodiment of the invention is shown in the accompanying drawings in which:

Figure 1 is a longitudinal sectional view of my burner and a supply passage therefor. Fig. 2 is a horizontal sectional view on the line 2—2 of Fig. 1 looking down. Fig. 3 is an inverted perspective view of one of the members of the burner.

Referring more particularly to the drawings, 1 indicates the outer shell or member of the burner which is preferably formed separate from the supply passage or mixing chamber 2, and secured thereto by suitable fasteners, as screws 3. A gas supply pipe 4 enters the chamber 2 at its outer end and is provided with the ordinary valve or regulator, not shown, while the air enters the supply or chamber through openings 5 in the usual manner. The other end of the chamber terminates in an unobstructed opening or passage around which is a flange 6, to which the outer shell 1 is secured as above described.

The outer shell comprises a hollow, slightly flaring cylindrical body having its upper end open and its bottom flat and perforated centrally, or provided with an opening at 7 which registers with the opening or passage at the end of the chamber 2. This permits of its being cheaply formed by casting and of its being easily secured to the flange 6 by the screws 3, which are inserted from the top.

The inner vessel or spreader 8 is substantially cup shaped with a flat bottom 9, which is adapted to stand directly above the perforation 7, and at right angles to the incoming current of partly mixed fuel or combustible material, and cause it to be more thoroughly mixed and deflected toward the wall of the shell or outer portion of the burner. Spacers, as ribs 10, are formed upon the exterior of the spreader, four being shown, each preferably rounded at its lower end as shown at 11 to more readily enter the shell, and extending from the bottom to a flange 12 at the top. The flange extends out over the top of the shell, preferably substantially parallel with the plane of the bottom, and is supported at a suitable distance above said top by supports, preferably shoulders 13, near the upper ends of the ribs 10. The spreader is slightly tapering and when placed in the shell the ribs engage therewith and properly space it therefrom so that the gas and air which strikes the shell at an angle and is more thoroughly mixed and deflected upward can pass freely until it strikes the flange 11 where it is again more thoroughly mixed and deflected outward to be consumed. By constructing the spreader in this manner it as well as the outer shell, can be cheaply formed by casting from a minimum amount of metal which is evenly distributed throughout the body of the spreader. And the passage 14 between the spreader and shell is free and unobstructed except by the slight ribs which stand in line with the flow of the gas, yet it has a sufficient number of bends or turns therein, each of which is sufficiently sharp or abrupt, as substantially right angled, as to cause the gas and air to be thoroughly mixed before it is discharged, and thereby produce such valuable results as experience has shown is secured by the form of burner herein disclosed.

As above described, my improved burner can be cheaply constructed and assembled and is very strong and durable, and experience has shown that it is capable of producing a constant heat of great intensity which can be readily utilized in many places, one very important use being for firing china-ware in furnaces where it is necessary that the heat be very intense and that there be substantially no soot or unconsumed products of combustion.

In adjusting the parts of the burner, and especially for using any particular kind of gas, the shoulders 13 are filed or ground off until they are just high enough to produce the best results after which no further adjustment is needed except by the valve in the usual manner. As the spreader fits loosely within the shell it can be removed at any time for cleaning or repairing the burner, and the entire burner can be easily secured in any desired position.

Although I have shown and described what I consider the most desirable form of constructing my burner it is evident that changes can be made therein, as for instance, the outer shell and mixing chamber may be formed integral, and I reserve the right to make such alterations and modifications as will come within the scope of my invention.

Having described my invention, what I claim as new and desire to secure by Letters Patent, is:

1. In a gas burner, a mixing chamber having a flanged open end, an open topped, substantially cylindrical shell having a flat bottom resting upon the flange of the chamber and having a perforation registering with the opening of said chamber, screws securing the shell to said flange, and a spreader in the shell having a flat bottom above the entrance from the mixing chamber, and having a flange at the top overhanging the top of the shell, and provided at its sides with spacing ribs having shoulders, such shoulders being located beneath the flange of the spreader and adapted to rest on top of the shell.

2. As a new article of manufacture, a spreader for gas burners comprising a cup-shaped, substantially cylindrical body having a flat bottom at its lower end and an outwardly extending flange at its upper end, and ribs upon the sides of the body, the lower end of each rib being rounded and the upper end shouldered under the flange.

In testimony whereof I have affixed my signature, in presence of two witnesses, this 18th day of November 1905.

RICHARD BROWN.

Witnesses:
M. R. SEELY,
F. M. BARTEL.